(12) United States Patent  
Guo et al.

(10) Patent No.: US 10,163,583 B2  
(45) Date of Patent: Dec. 25, 2018

(54) GRAPHENE OXIDE AND CARBON NANOTUBE INK AND METHODS FOR PRODUCING THE SAME

(71) Applicant: The Regents of The University of California, Oakland, CA (US)

(72) Inventors: Shirui Guo, Riverside, CA (US); Wei Wang, Newport Beach, CA (US); Cengiz S Ozkan, San Diego, CA (US); Mihrimah Ozkan, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 121 days.

(21) Appl. No.: 15/034,377

(22) PCT Filed: Nov. 5, 2013

(86) PCT No.: PCT/US2013/068574  
§ 371 (c)(1),  
(2) Date: May 4, 2016

(87) PCT Pub. No.: WO2015/069226  
PCT Pub. Date: May 14, 2015

(65) Prior Publication Data  
US 2016/0293347 A1     Oct. 6, 2016

(51) Int. Cl.  
*H01G 11/36*       (2013.01)  
*B82Y 30/00*       (2011.01)  
(Continued)

(52) U.S. Cl.  
CPC .............. *H01G 11/36* (2013.01); *B82Y 30/00* (2013.01); *C09D 11/52* (2013.01); *H01G 11/24* (2013.01);  
(Continued)

(58) Field of Classification Search  
CPC ........ H01G 11/36; H01G 11/24; H01G 11/26; H01G 11/28; H01G 11/32; H01G 11/52;  
(Continued)

(56) References Cited

U.S. PATENT DOCUMENTS

2008/0031802 A1    2/2008  Ma et al.  
2008/0048152 A1*   2/2008  Jang ................. B82Y 30/00  
                                          252/378 R  
(Continued)

FOREIGN PATENT DOCUMENTS

CN     105829276 A     8/2016  
JP     2008517863 A    5/2008  
(Continued)

OTHER PUBLICATIONS

"International Application Serial No. PCT/US2013/068574, International Search Report dated Mar. 21, 2014", 2 pgs.  
(Continued)

*Primary Examiner* — Dion R Ferguson  
(74) *Attorney, Agent, or Firm* — Schwegman Lundberg & Woessner, P.A.

(57) ABSTRACT

An energy device including a paper based substrate having a top surface and a bottom surface, and a graphene oxide and carbon nanotube composite deposited onto at least the top surface. The energy device can be used as an electrode in, for example, a supercapacitor.

19 Claims, 14 Drawing Sheets

(51) Int. Cl.

| | |
|---|---|
| *C09D 11/52* | (2014.01) |
| *H01G 11/24* | (2013.01) |
| *H01G 11/26* | (2013.01) |
| *H01G 11/28* | (2013.01) |
| *H01G 11/32* | (2013.01) |
| *H01G 11/52* | (2013.01) |
| *H01G 11/86* | (2013.01) |
| *B82Y 40/00* | (2011.01) |

(52) U.S. Cl.
CPC ............. *H01G 11/26* (2013.01); *H01G 11/28* (2013.01); *H01G 11/32* (2013.01); *H01G 11/52* (2013.01); *H01G 11/86* (2013.01); *B82Y 40/00* (2013.01); *Y02E 60/13* (2013.01)

(58) Field of Classification Search
CPC ........ H01G 11/86; B82Y 30/00; B82Y 40/00; C09D 11/52; Y02E 60/13
See application file for complete search history.

(56) References Cited

U.S. PATENT DOCUMENTS

| | | | | |
|---|---|---|---|---|
| 2010/0055025 | A1* | 3/2010 | Jang .................. | B82Y 30/00 423/448 |
| 2010/0330358 | A1* | 12/2010 | Hashimoto ............ | B82Y 30/00 428/323 |
| 2011/0017585 | A1* | 1/2011 | Zhamu .................. | B82Y 30/00 204/157.42 |
| 2011/0079748 | A1* | 4/2011 | Ruoff ..................... | B82Y 30/00 252/62.2 |
| 2011/0165321 | A1 | 7/2011 | Zhamu et al. | |
| 2013/0252499 | A1* | 9/2013 | Zhou ........................ | D04H 1/00 442/327 |

FOREIGN PATENT DOCUMENTS

| | | |
|---|---|---|
| JP | 2011500488 A | 1/2011 |
| JP | 2013155461 A | 8/2013 |
| JP | 2014505650 A | 3/2014 |
| KR | 1020160081939 A | 7/2016 |
| WO | WO-2009054415 A1 | 4/2009 |
| WO | WO-2009101985 A1 | 8/2009 |
| WO | WO-2012088697 A1 | 7/2012 |
| WO | WO-2015069226 A1 | 5/2015 |

OTHER PUBLICATIONS

"International Application Serial No. PCT/US2013/068574, Written Opinion dated Mar. 21, 2014", 5 pgs.

Chinese Application Serial No. 201380080716.0, Office Action dated Jan. 18, 2017, W/ English Translation, 10 pgs.

"International Application Serial No. PCT/US2013/068574, International Preliminary Report on Patentability dated May 19, 2016", 7 pgs.

Japanese Application Serial No. 2016-526766, Office Action dated Oct. 3, 2017, W/ English Translation, 9 pgs.

Turkey Application Serial No. 2015/07371, Office Action dated Dec. 12, 2017, 4 pgs.

\* cited by examiner

GRAPHENE OXIDE AND CARBON NANOTUBE INK AND METHODS FOR PRODUCING THE SAME

RELATED APPLICATION

This application is a U.S. National Stage Filing under 35 U.S.C. 371 from International Patent Application Serial No. PCT/US2013/068574, filed on Nov. 5, 2013, and published on May 14, 2015 as WO 2015/069226, which is incorporated by reference herein in its entirety.

TECHNICAL FIELD

This document relates generally to graphene oxide and carbon nanotube ink and, in particular, to graphene oxide and carbon nanotube ink for use in energy devices.

BACKGROUND

Carbon allotropes have been useful for many applications such as electronic devices, sensors, photovoltaic devices, and energy storage devices. Supercapacitors have attracted attention due to their high power density and long cycle lifetime compared to batteries. Carbon nanotubes (e.g., single-wall carbon nanotubes) have been recognized as significant materials for applications requiring large surface area as well as high conductivity and stability for a variety of electrochemical conditions. However, there can be processing challenges limiting the use of single-wall carbon nanotubes for many applications.

OVERVIEW

Incorporating single-wall carbon nanotubes into energy devices can exhibit processing challenges. For example, the single-wall carbon nanotubes (SWNTs) can have a low solubility or dispersion concentration in water or organic solvents and can aggregate without surface functionalization or surfactant assistance due to van der Waal's interactions, which reduces the effective surface area and further reduces the capacitance for energy storage applications.

Previous approaches have been employed to disperse SWNTs with a variety of functionalization methods, including acid treatment, surfactant binding, and non-covalent binding molecules. While non-covalent functionalization can disperse SWNTs without introducing any surfactants or reducing the conductivity, it is still a major challenge to achieve a high concentration of SWNTs in a dispersion. Graphene oxide (GO) has amphiphilic properties and previous approaches combined reduced graphene oxide and SWNTs to produce a high performance supercapacitor. However, using reduced graphene oxide can increase the cost of fabrication. Further previous approaches have utilized nickel foam, titanium foil, stainless steel, and copper mesh as a currently collector for the supercapacitor. However, such current collectors generally utilize a binder material for fabrication.

The present disclosure provides a graphene oxide/SWNT composite ink that can be incorporated with a paper based substrate to form an electrode for a supercapacitor. Incorporating the paper based substrate can be advantageous for supercapacitors due to the low cost, light weight, large flexibility, binder-free process, and the fact that there is no need for having a backbone for the current collector. Hence, the graphene oxide/SWNT composite ink of the present disclosure can provide a low cost and high-throughput preparation of paper based electrodes for supercapacitors.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure provides various embodiments for the synthesis and application of a graphene oxide (GO) and single walled carbon nanotube (SWNT) ink (referred to herein as "GO-SWNT ink" and "GO-SWNT dispersion") for fabricating electrochemically stable supercapacitors. As described herein, the SWNTs are dispersed using a GO and deionized water solution (2 milligrams per milliliter (mg/ml)) with sonication support to achieve a SWNT concentration of 12 mg/ml, without surfactant assistance. The GO-SWNT ink is incorporated with a paper based substrate via a dip casting method to form an energy device (referred to herein as "GO-SWNT paper electrode") for use in supercapacitors.

By employing different concentrations of SWNT in the GO-SWNT ink, GO-SWNT paper electrodes provide different capacitance values. In an example, the highest value of specific capacitance reaches 295 Farads per gram (F/g) at a current density of 0.5 Ampere per gram (A/g) with a GO/SWNT weight ratio of 1:5. The cycling stability for a supercapacitor incorporating the GO-SWNT paper electrode indicates capacitance retention of 85% over 60000 cycles.

The interaction between GO and SWNTs can separate the SWNTs within the dispersion and provide individual GO sheets in the composite ink, which increases the effective active area for electrochemical reaction. In an example, the GO-SWNT composite ink can include at least 12 mg/ml of SWNT dispersed in DI water without surfactant assistance. That is, the GO-SWNT ink is substantially free from a surfactant. "Substantially" as the term is used herein means completely or almost completely; for example, the GO-SWNT ink that is "substantially free" of the surfactant either has none of the binder or contains such a trace amount that any relevant functional property of the GO-SWNT ink is unaffected by the presence of the trace amount. The GO-SWNT ink demonstrates high stability and permeability, and can be an effective ink material for preparing paper electrodes. Supercapacitors based on paper electrodes can be easily fabricated without the need for other additives, binders, or additional current collectors. The energy devices and methods of the present disclosure can provide a binder free ink-printing method for large scale fabrication of electrochemical energy devices such as supercapacitors.

Figure 1:
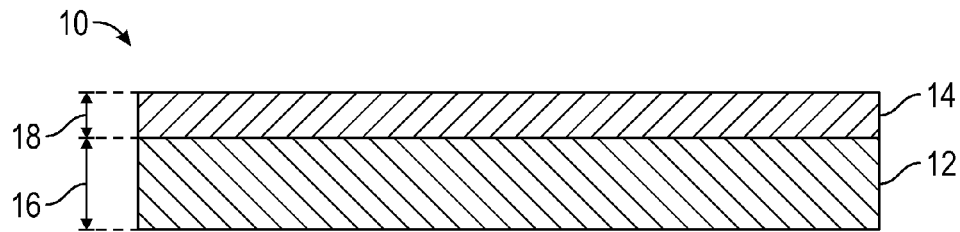
FIG. 1 illustrates generally a cross-section of a portion of an energy device 10

FIG. 1 illustrates generally a cross-section of a portion of an energy device 10 (e.g., also referred to herein as "GO-SWNT paper electrode 10"). In an example, the GO-SWNT paper electrode 10 illustrated in FIG. 1 can be used as an electrode, for example, in a supercapacitor. The GO-SWNT paper electrode 10 can include a paper based substrate 12 and a GO-SWNT composite 14. The paper based substrate 12 can have a top surface and a bottom surface. The paper based substrate 12 can include at least filter paper, printing paper, and polyethylene (PE) membrane film.

In an example, the GO-SWNT paper electrode 10 can include the GO-SWNT composite 14. "GO-SWNT composite" as used herein refers the GO-SWNT ink after it has dried. That is, the GO-SWNT ink is applied to the paper based substrate 12 and allowed to dry to form the GO-SWNT composite 14. As discussed here, the GO-SWNT composite 14 can include GO (e.g., GO flakes) and carbon nanotubes (e.g., single wall carbon nanotubes), where the GO-SWNT composite 14 is substantially free from a surfactant. As shown in FIG. 1, the GO-SWNT composite 14 is applied to a top surface of the paper based substrate 12. However, the bottom surface and side surfaces can also include the GO-SWNT composite 14.

In an example, the GO-SWNT composite 14 the GO (e.g., GO flakes) can be single layer GO flakes. In an example, the GO flakes can have a thickness within a range of about 0.35 nanometers (nm) to about 100 nm. For example, the GO flakes have a thickness within a range of about 0.35 nm to about 50 nm and about 0.6 nm to about 2 nm, such as about 00.7 nm, 0.9 nm, 1.1 nm, 1.3 nm, 1.5 nm, 1.7 nm, and 1.9 nm. In an example, the GO flakes can have a length within a range of 10 nm to 500 μm. For example, the GO flakes have a length within a range of about 20 nm to about 300 nm, such as about 50 nm, 100 nm, and 200 nm.

In an example, the GO-SWNT composite 14 can include about 1 weight percent (wt. %) to about 99 wt. % of the GO (e.g., GO flakes). In an example, the GO-SWNT composite 14 can include about 15 wt. % to about 85 wt. % of the GO (e.g., GO flakes). In an example, the GO-SWNT composite 14 can include about 1 wt. % to about 99 wt. % of the SWNT. For example, the GO-SWNT composite 14 can include 15 wt. % to 85 wt. % of the SWNT, such as about 20 wt. %, 30 wt. %, 40 wt. %, 50 wt. % 60 wt. % and 70 wt. %.

In an example, the GO-SWNT paper electrode 10 can include the carbon nanotubes. In an example, the carbon nanotubes are single-wall carbon nanotubes (SWNT). The SWNTs can have an average height of about 10 μm to about 10,000 μm. For example, the average height of the SWNTs can be within a range of about 100 nm to about 500 nm, such as 25 nm, 50 nm, 100 nm, and 150 nm. In an example, average height of the carbon nanotubes can be about 50 μm.

In an example, the carbon nanotubes can have an average outer diameter within a range of about 2 nm to about 20 nm. For example, the carbon nanotubes can have an average outer diameter within a range of about 8 nm to about 15 nm, such as 9 nm, 10 nm, 11 nm, 12 nm, 13 nm, and 14 nm. In an example, the carbon nanotubes can have an average inner diameter of about 0.5 nm to about 50 nm. For example, the carbon nanotubes can have an average inner diameter of about 5 nm to about 10 nm, such as 6 nm, 7 nm, 8 nm, and 9 nm. In an example, the carbon nanotubes can have a wall thickness within a range of from about 1 layer to about 50 layers.

Figure 2:
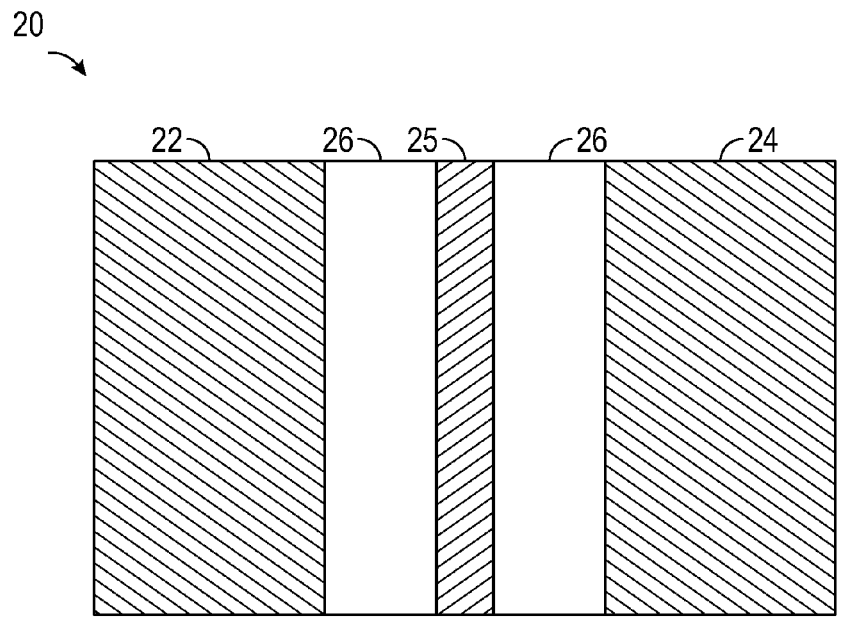
FIG. 2 illustrates generally a cross-section of a supercapacitor.

FIG. 2 illustrates generally a cross-section of a supercapacitor 20 including the GO-SWNT paper electrode 10 of FIG. 1. The supercapacitor 20 can include a first electrode 22, a second electrode 24, an electrolyte 26, and a separator 25. The first electrode 22 and the second electrode 24 can be the GO-SWNT paper electrode 10, as illustrated in FIG. 1. In one example, the first electrode 22 and the second electrode 24 can include the paper based substrate 12 having a top surface and a bottom surface and the GO-SWNT composite 14 deposited onto at least the top surface.

In an example, the electrolyte 24 can be potassium hydroxide. However, other electrolytes suitable for use in a supercapacitor can be used. For example, aqueous electrolyte systems (including sulfuric acid, lithium sulfate and sodium sulfate), organic electrolyte systems, and ionic liquids can be used as the electrolyte 24. The separator 2 can include be a porous membrane, such as polyethylene (PE) membrane, polypropylene (PP) membrane, anodic aluminum oxide (AAO) template, block-co-polymer (BCP), and filter paper. Other porous membranes suitable for use in a supercapacitor can be used. The supercapacitor 20 incorporating the GO-SWNT paper electrode 10 can provide advantages over previous supercapacitors, batteries, and fuel cells. For example, supercapacitors based on GO-SWNT paper electrode can be easily fabricated without the need for other additives, binders, or additional current collectors. The method disclosure herein provides a binder free ink-printing method for large scale fabrication of electrochemical energy storage devices.

Figure 3:
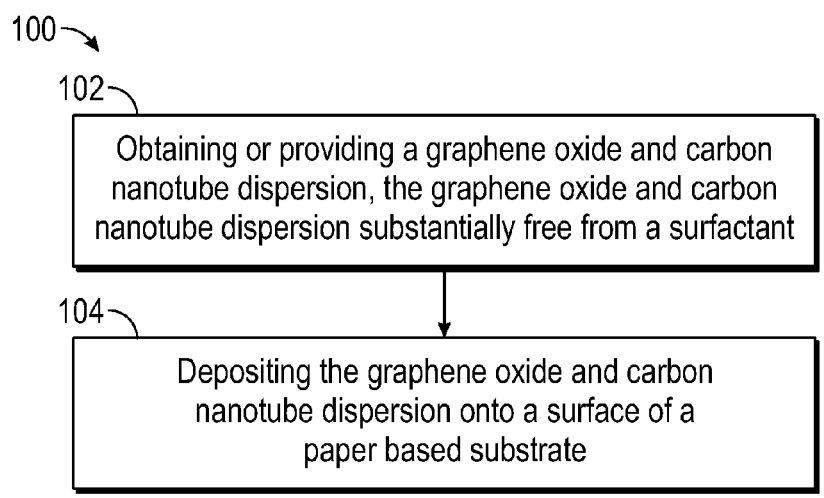
FIG. 3 illustrates generally a method of forming a graphene oxide (GO)-SWNT paper electrode.

FIG. 3 illustrates generally a flow diagram of a method 100 for forming a GO-SWNT paper electrode. In an example, method 100, at step 102, can include obtaining or providing a GO-SWNT dispersion (e.g., GO-SWNT ink), where the GO-SWNT dispersion is substantially free from a surfactant.

The method 100, at step 104 can include depositing the GO-SWNT dispersion onto a surface of a paper based substrate. For example, depositing the GO-SWNT dispersion can include submerging (e.g., dip-coating) the paper based substrate into the GO-SWNT. Other methods such as spin coating, drop casting and blade-coating are also possible.

In an example, the GO-SWNT dispersion can include SWNTs within a range of about 0.1 mg/ml to about 12 mg/ml. For example, the GO-SWNT dispersion can include SWNTs within a range of about 0.5 mg/ml to about 10 mg/ml, such as 1 mg/ml, 2 mg/ml, 3 ml/ml, 4 mg/ml, 5 mg/ml, 6 mg/ml, 6 mg/ml, 7 mg/ml, 8 mg/ml, and 9 mg/ml. In one example, the GO-SWNT dispersion can include 10 mg/ml of SWNTs.

In an example, the GO-SWNT dispersion can include GO flakes within a range of about 0.1 mg/ml to about 10 mg/ml. In an example, the GO-SWNT dispersion can include the GO flakes within a range of about 1 mg/ml to about 5 mg/ml, such as 2 mg/ml, 3 mg/ml, and 4 mg/ml.

The pH of the GO-SWNT dispersion can be within a range of about 1 to about 14. For example, the pH of the GO-SWNT dispersion can be within a range of about 6 to about 12. In an example, the pH of the GO-SWNT dispersion is about 7. In an example, the method can include drying the GO-SWNT dispersion deposited onto the surface of the paper based substrate.

In an example, depositing the plurality of metal oxide nanostructures can include submerging (e.g., dip-coating) the coated porous metal substrate into a solution including the plurality of metal oxide nanostructures and deionized water. In an example, the plurality of metal oxide nanostructures can be chosen from a plurality of $RuO_2$ nanoparticles and a plurality of $MnO_2$ nanowires.

EXAMPLES

The following examples are given to illustrate, but not limit, the scope of the present disclosure.

Testing Equipment

Atomic force microscopy is conducted (Multimode-5, Veeco) with operation in the tapping mode using standard silicon cantilevers. Fourier transform infrared spectroscopy (FTIR) spectra are recorded with a Bruker Equinox 55 with a microscope and step scan capability (0.5 $cm^{-1}$ resolution) at room temperature. Raman spectra is taken using a Renishaw micro-Raman spectrometer with a 532 nm visible laser as the excitation source. SEM images are recorded using a Leo SUPRA 55 microscope.

Preparation of Graphene Oxide

Graphene oxide (GO) flakes were prepared by using a modified Hummers method. Graphite (1 gram (g)) and 0.75 g of sodium nitrate ($NaNO_3$) are placed in a flask. Sulfuric acid (75 ml; $H_2SO_4$) is added while stirring in an ice-water bath, and 4.5 g of potassium permanganate ($KMnO_4$) is slowly added over a period of 1 h. Stirring is continued for 2 hours in the ice-water bath. The flask is then placed in a 35° C. oil bath for 2 hours. Deionized water (100 ml) is added into the flask with the temperature rising to 95° C., after 1 hour stirring with hydrogen peroxide (3 mL; $H_2O_2$; 30 wt % aqueous solution) added and the mixture then stirred for 2 hours at 25° C. The mixture is washed thoroughly with deionized water through filtration, and then the GO flakes are dispersed in water with mechanical agitation. After filtering, the GO flakes (0.1 g) are dispersed in dionized water (100 mL) and ultrasonicated for 30 minutes. In order to obtain a purified single layer GO dispersion, the following method is applied: the obtained dispersion is ultrasonicated for another 30 min, and then centrifuged at 1000 revolutions per minutes (rpm) for 20 minutes to remove the large particles in the solution. After several centrifugations, the upper solution is then centrifuged at 8000 rpm for 20 minutes to remove any remaining soluble impurities and much smaller GO layers. This step is repeated several times until the upper part is clear. Then the precipitation is finally dispersed in deionized water with mild sonication.

Atomic Force Microscopy (AFM) of Graphene Oxide Flakes

Figure 4:
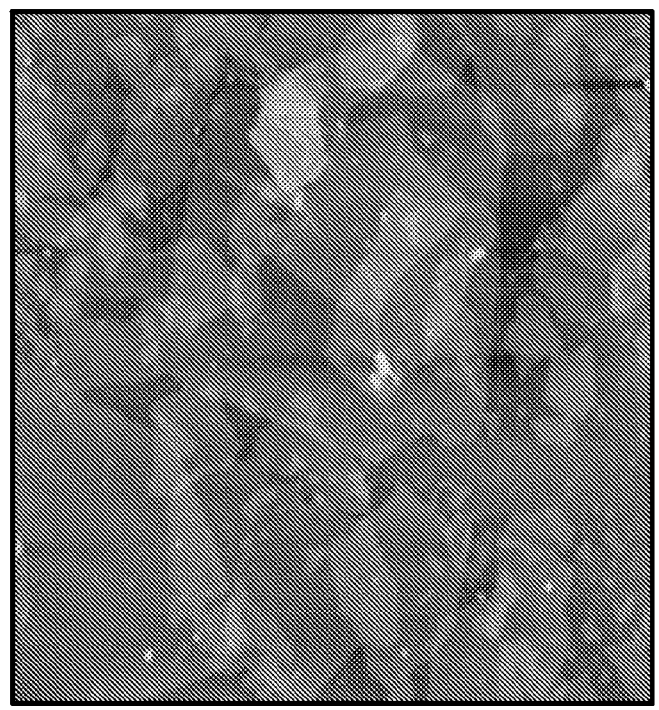
FIG. 4 illustrates an atomic force microscopy of graphene oxide flakes.
Figure 5:
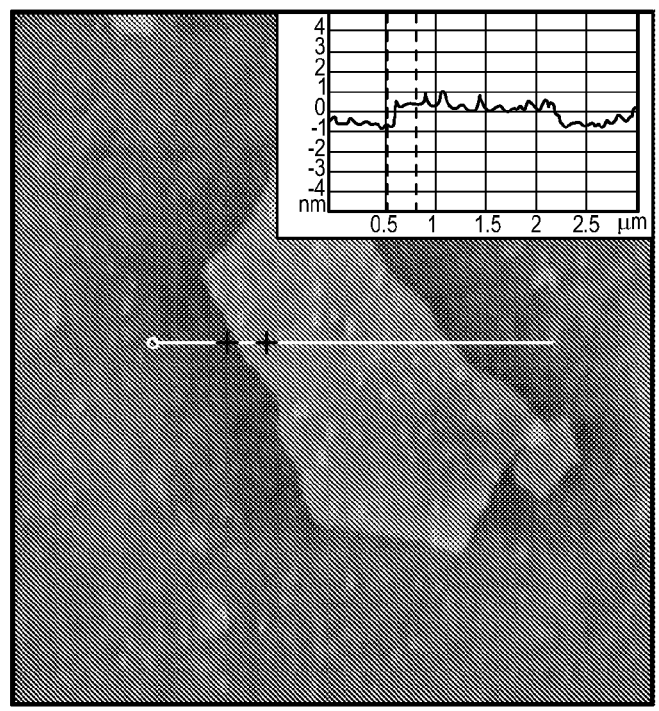
FIG. 5 illustrates an atomic force microscopy of graphene oxide flakes.
Figure 6:
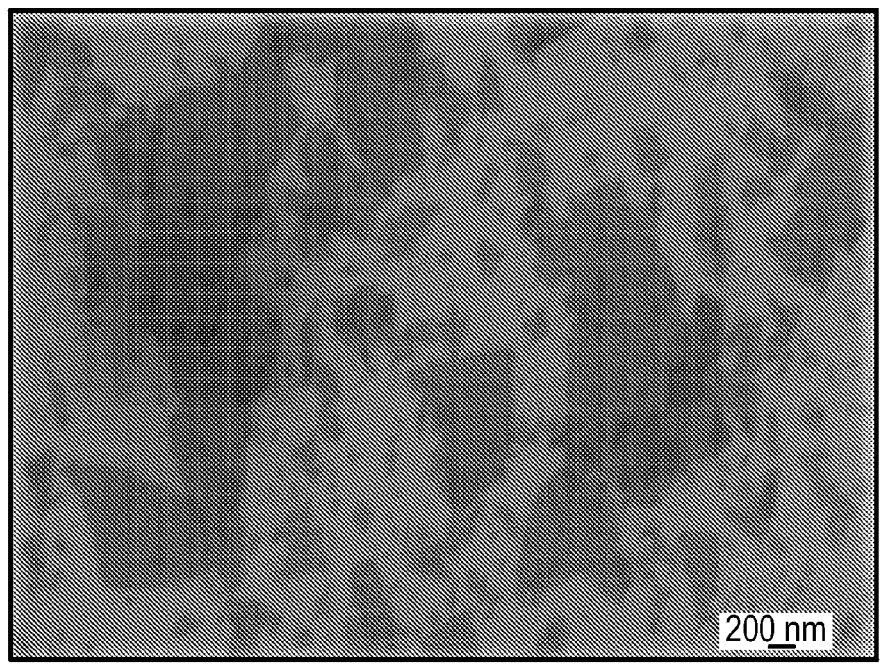
FIG. 6 illustrates a scanning electron microscope (SEM) image of graphene oxide flakes
Figure 7:
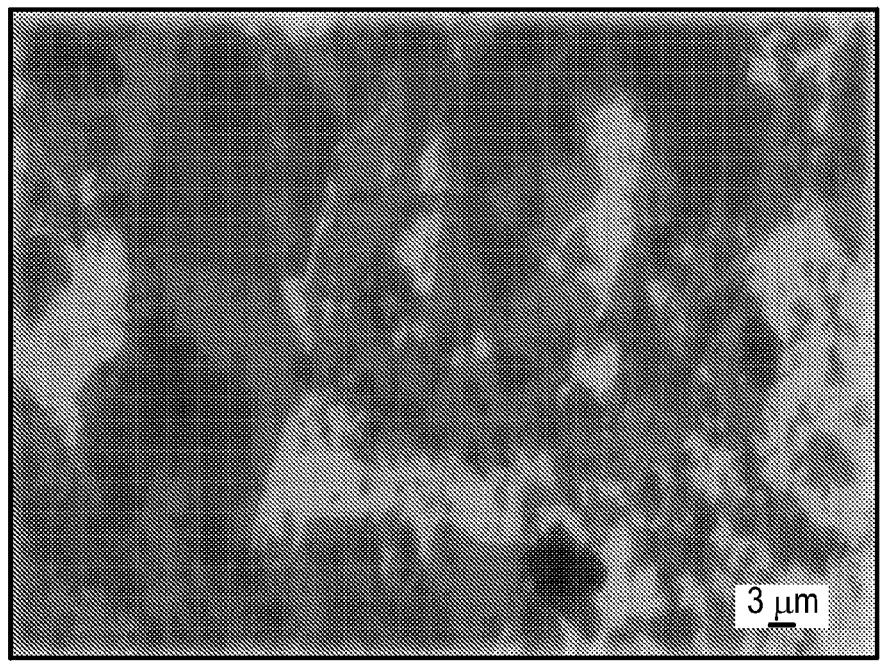
FIG. 7 illustrates a SEM image of graphene oxide flakes.
Figure 8:
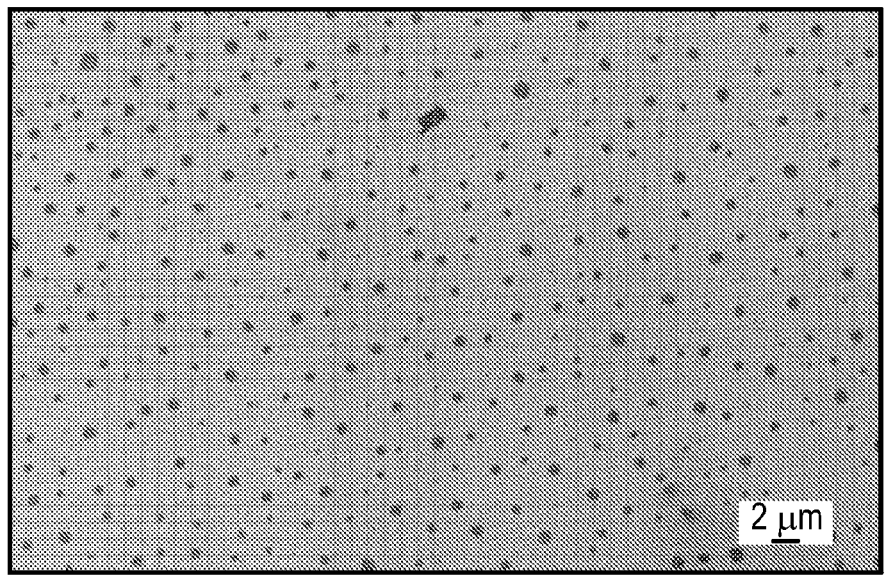
FIG. 8 illustrates a SEM image of graphene oxide flakes.
Figure 9:
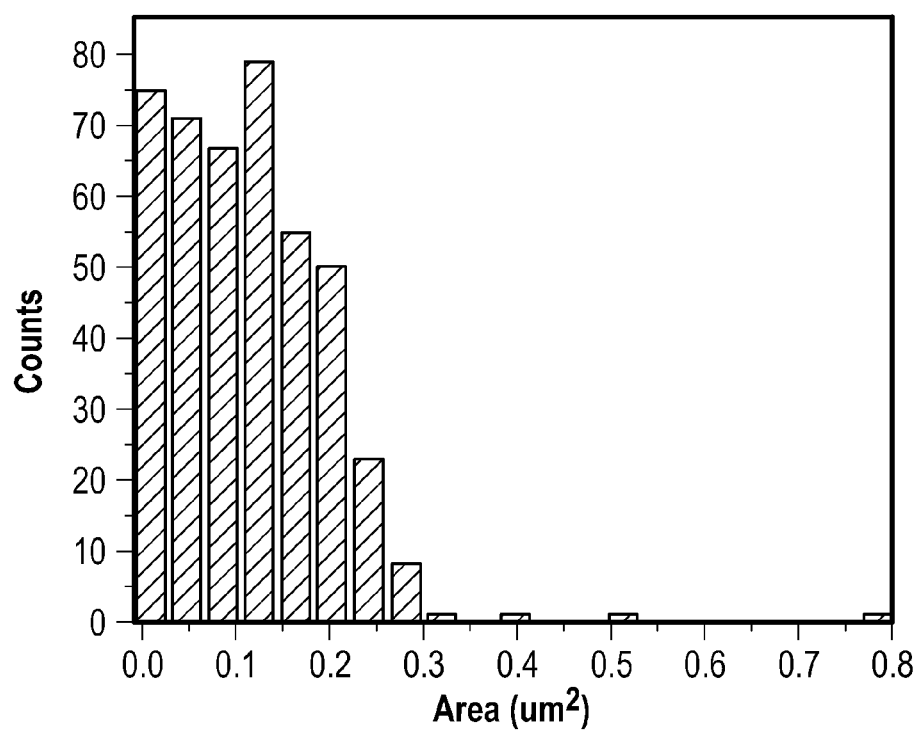
FIG. 9 illustrates size distribution of graphene oxide flakes of FIG. 8.
Figure 10:
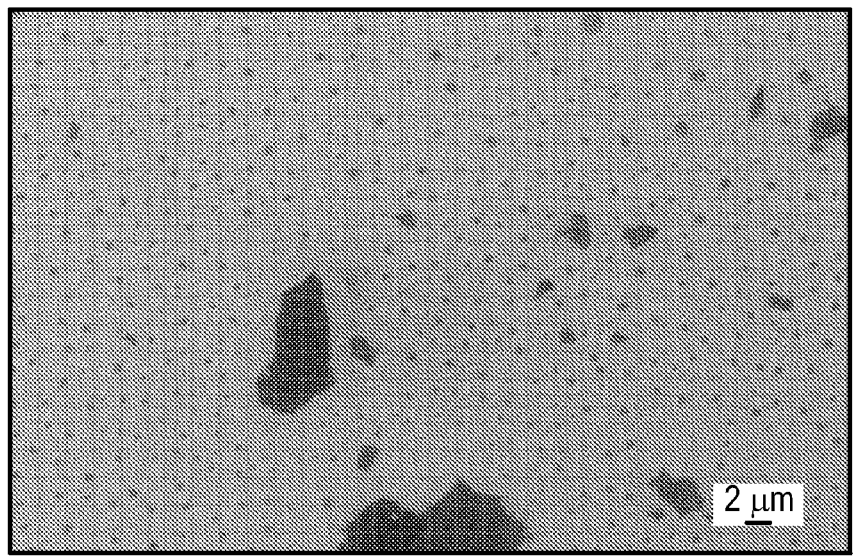
FIG. 10 illustrates a SEM image of graphene oxide flakes.
Figure 11:
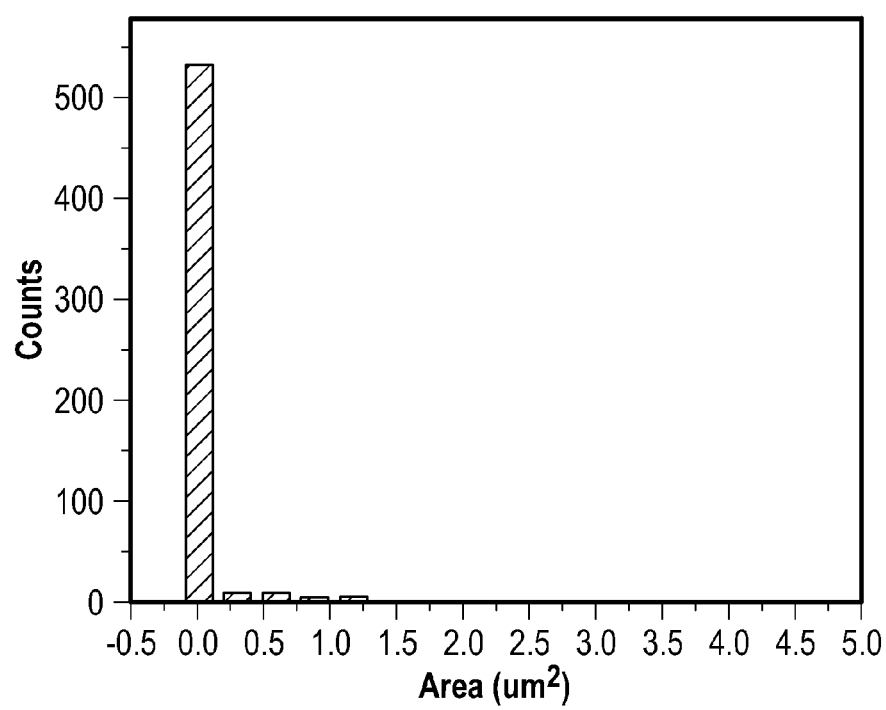
FIG. 11 illustrates size distribution of graphene oxide flakes of FIG. 10.
Figure 12:
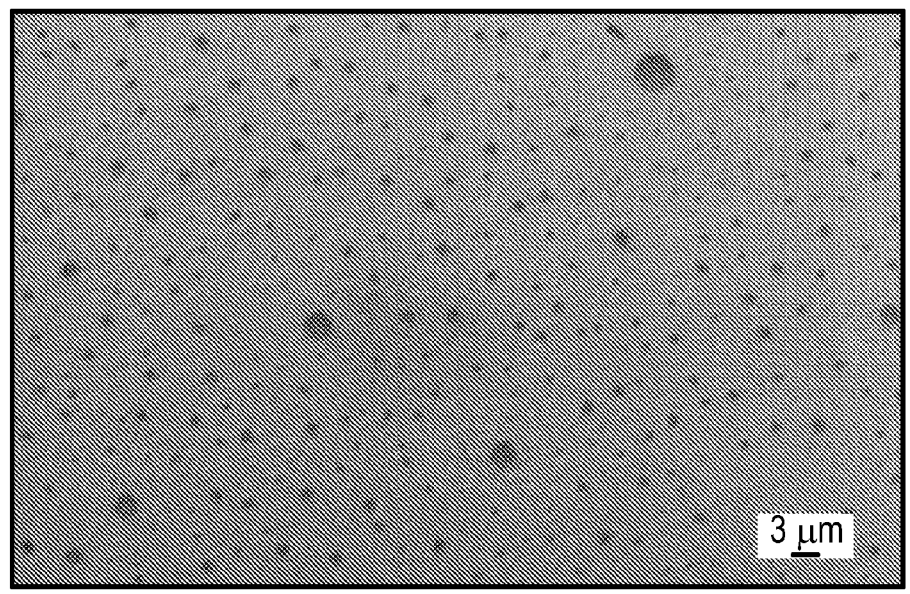
FIG. 12 illustrates a SEM image of graphene oxide flakes.
Figure 13:
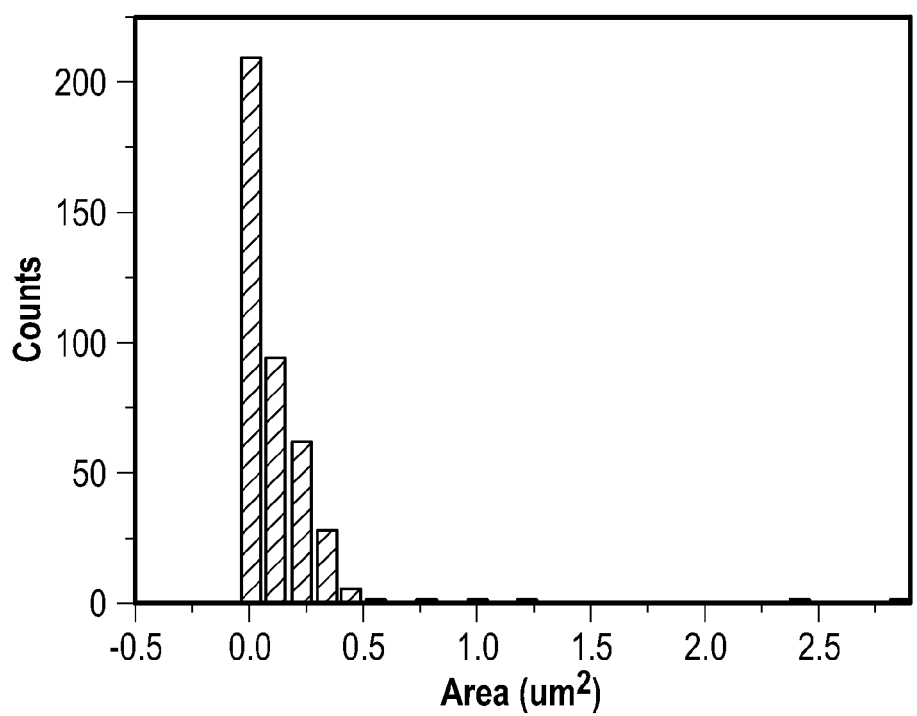
FIG. 13 illustrates size distribution of graphene oxide flakes of FIG. 12.
Figure 14:
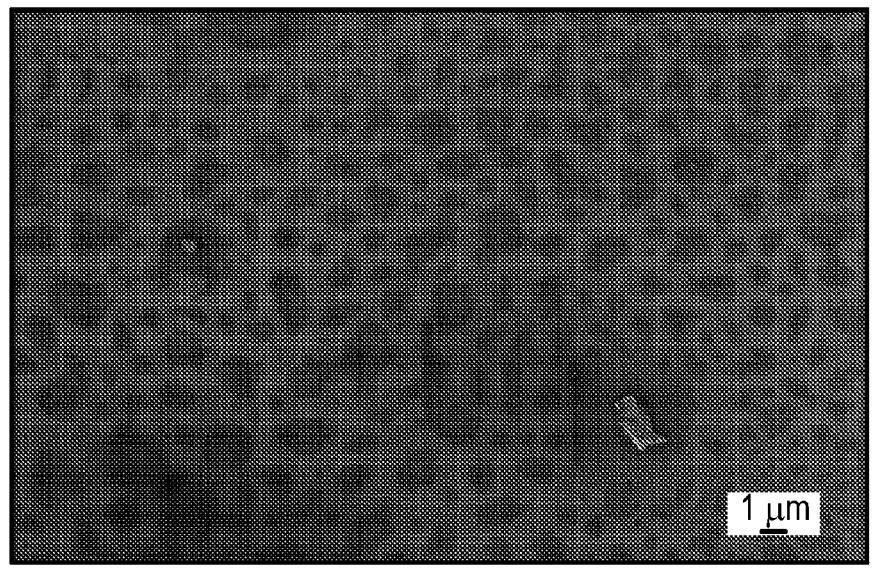
FIG. 14 illustrates a SEM image of graphene oxide flakes.
Figure 15:
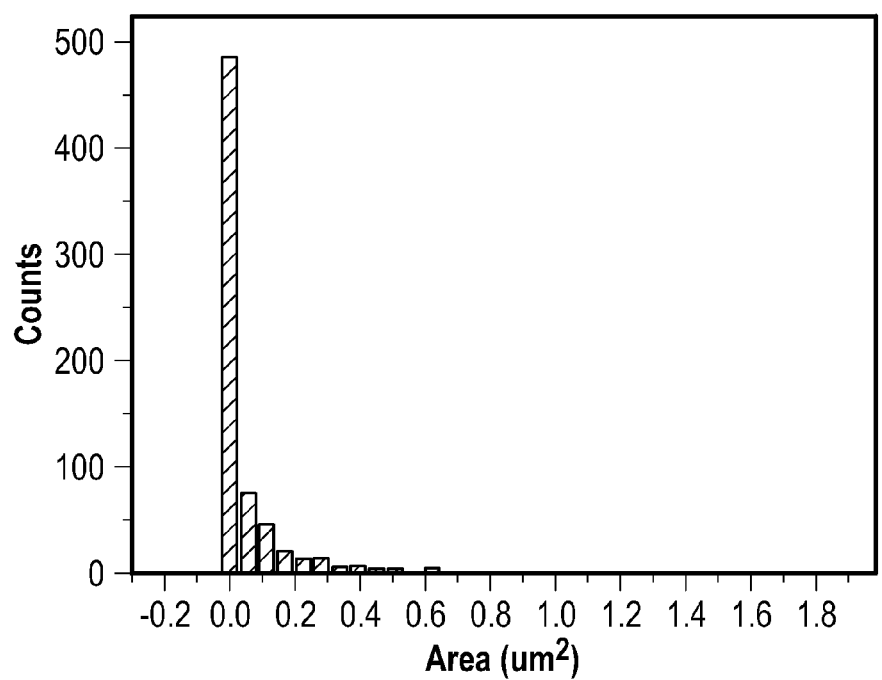
FIG. 15 illustrates size distribution of graphene oxide flakes of FIG. 13.

AFM was conducted and FIGS. 4 and 5 illustrate the AMF images. FIGS. 4 and 5 illustrate the thickness of the GO flakes as about 0.5 nm Scanning Electron Microscope (SEM) Images of Graphene Oxide Flakes FIGS. 6 and 7 illustrate SEM images of the graphene oxide flakes. The SEM images demonstrate that the size distribution of GO flakes is in the range of about 20 nm to about 500 μm.

FIGS. 8, 10, 12, and 14 illustrate SEM images of GO and FIGS. 9, 11, 13, and 15 illustrate different size distributions of FIGS. 8, 10, 12, and 13, respectively. Uniform size of GO flakes can be obtained with several successive centrifugation steps. Size distribution in the range of about 200 nm to about 500 nm for GO flakes is utilized for dispersing the SWNTs. With uniform and smaller size GO flakes, the interaction between the GO flakes and the SWNTs can increase.

Forming the GO-SWNT Dispersion

Varying amounts of SWNT (Sigma Aldrich) are added into an as-obtained GO solution with a concentration of 2 mg/ml of the GO flakes. After 10-25 minutes of ultrasonication, the black ink is formed.

pH Adjustment to the GO-SWNT Dispersion

The pH of the GO-SWNT dispersion was adjusted with NaOH and/or hydrogen chloride (HCl) to further test the modulation of dispersion properties. With an increase in the pH value, the GO-SWNT dispersion becomes stable without precipitation even after one month duration. When the pH value is nearly 4, the dispersion is very unstable, and precipitation appears in just 10 min after sonication-assisted dispersion. However the with addition of 1M NaOH, the stability of the dispersion increases. The stability of such GO-SWNT dispersions demonstrates the potential for long-term use. It is possible with the increase of OH⁻ concentration that the carboxylic group was deprotonated resulting in more negatively charged species, which facilitates the separation of the SWNT bundles.

Figure 16:
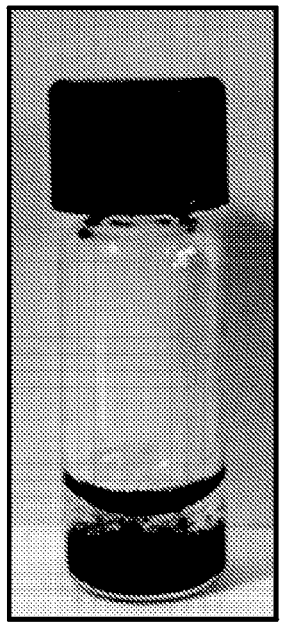
FIG. 16 illustrates a photograph of a GO-SWNT dispersion.
Figure 17:
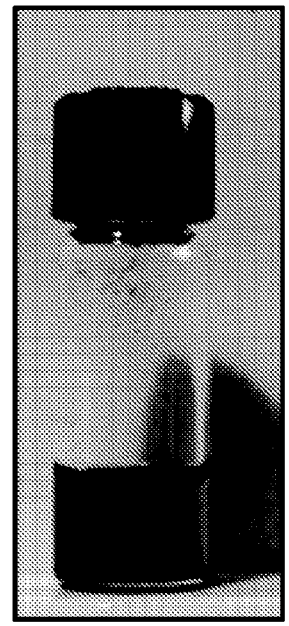
FIG. 17 illustrates a photograph of a GO-SWNT dispersion.
Figure 18:
FIG. 18 illustrates a photograph of a GO-SWNT dispersion.
Figure 19:
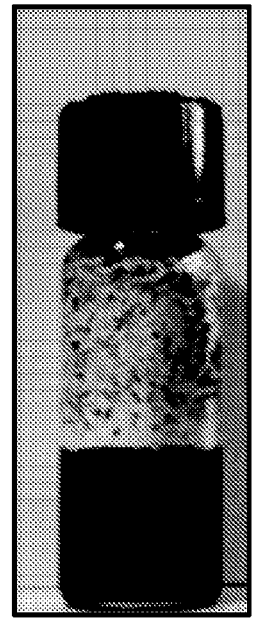
FIG. 19 illustrates a photograph of a GO-SWNT dispersion.

FIGS. 16-19 illustrate photographs of a GO-SWNT dispersions (e.g., GO-SWNT inks) having different pH levels. The GO-SWNT dispersions include 5 mg of SWNT dispersed in 2 mg/ml of the GO solution at different pH levels. FIG. 16 illustrates the GO-SWNT dispersion having a pH of 4, FIG. 17 illustrates the GO-SWNT dispersion having a pH of 7, FIG. 16 illustrates the GO-SWNT dispersion having a pH of 9, and FIG. 16 illustrates the GO-SWNT dispersion having a pH of 12. The volume differences result from the addition of NaOH to adjust the pH. Note that black materials visible inside in FIG. 19 are residues after shaking.

As the concentration of SWNT increases, the viscosity increases. In an example of a GO-SWNT dispersion having a 10 mg/ml concentration of SWNT, the GO-SWNT ink formed a gel.

To investigate the ability of GO to disperse SWNTs, the weight ratio between SWNT and GO was increased. Surprisingly, 12 mg/ml of SWNT was achieved in the GO-SWNT ink with a 2 mg/ml GO flake solution (e.g., the GO flakes and deionized water), without surfactant assistance. That is, 12 mg/ml were added to the GO flake solution.

Forming Example 1

Two pieces of woven paper are dipped into the GO-SWNT ink having a GO:SWNT weight ratio of 5:1. The coated pieces of paper are dried in a vacuum oven at 40° C. for 4 hours to form a GO-SWNT paper electrode including a GO-SWNT composite. A two-electrode measurement technique is employed for the electrochemical measurements, where two pieces of GO-SWNT paper electrodes are assembled into a sandwich structure with a porous membrane (Celgard 3501) as a separator. Potassium hydroxide (KOH; 6M) aqueous solution is used as the electrolyte. Packaging of the supercapacitor cell is conducted at room temperature under atmospheric conditions.

Forming Example 2

Repeat Example 1 except the GO-SWNT ink has a GO:SWNT weight ratio of 1:1.

Forming Example 3

Repeat Example 1 except the GO-SWNT ink has a GO:SWNT weight ratio of 1:3.

Forming Example 4

Repeat Example 1 except the GO-SWNT ink has a GO:SWNT weight ratio of 1:5.

SEM Images of GO-SWNT Electrode

Figure 20:
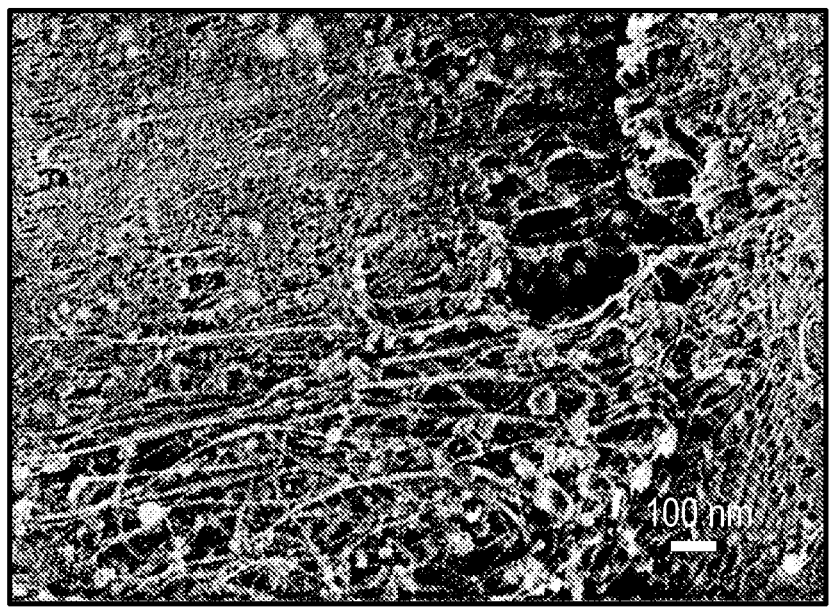
FIG. 20 illustrates a SEM image of GO-SWNT paper electrode.
Figure 21:
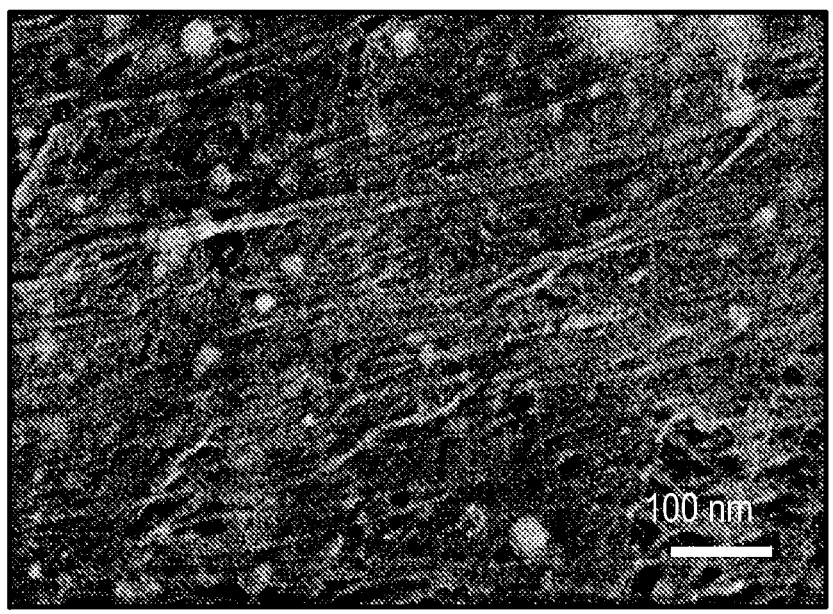
FIG. 21 illustrates a SEM image of GO-SWNT paper electrode.

GO flakes and SWNTs tend to restack or form bundles due to van der Waals forces. The non-covalent interaction between GO and SWNT can impact not only on the separation of SWNT bundles but also on the prevention of GO flake restacking. FIGS. 20 and 21 illustrate SEM images of the GO-SWNT paper electrode of Example 1. It is shown that SWNTs were separated and embedded in the GO flakes. Though partial restacking of GO sheets happens after mixing with the SWNTs, they play a role in preventing further restacking which provides the chance for realizing single GO sheets.

FTIR Spectra

Figure 22:
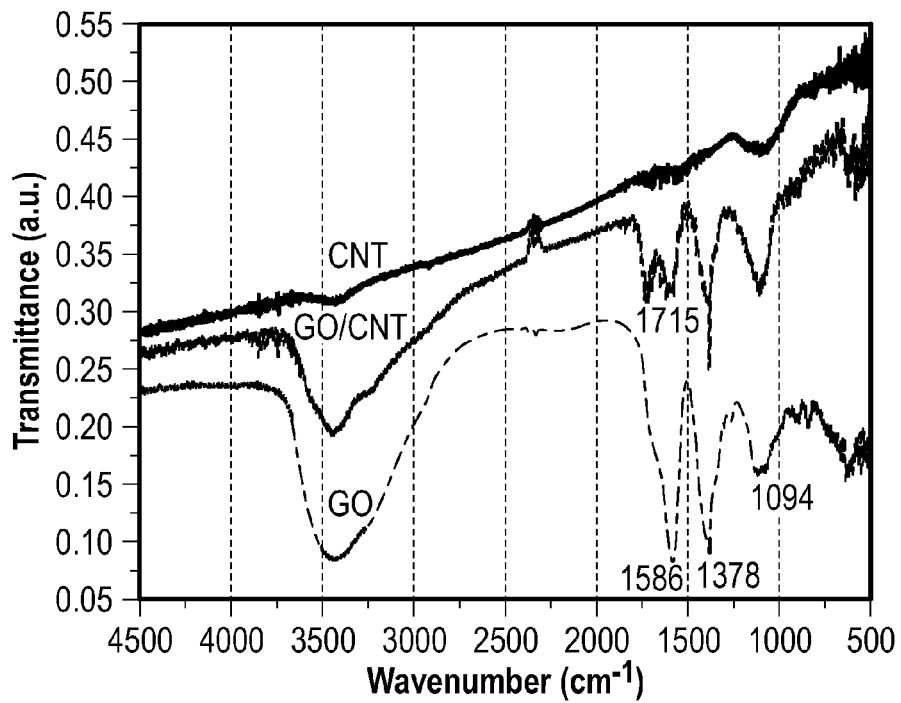
FIG. 22 illustrates FTIR spectra of GO flakes, SWNTs, and the GO-SWNT dispersion

FIG. 22 illustrates FTIR spectra of GO flakes, SWNTs, and the GO-SWNT ink. The dominant chemical structures present on the surface of GO flakes are tertiary alcohols and ethers with very low quantities of carboxylic acid at the periphery of the GO. These structural features provide fascinating properties for the GO flakes. While hydroxyl groups, ketone groups, ether groups and carboxylic groups provide the chance for hydrogen bonding between the GO flake and water molecules, the intact π bond will provide the chance for π-π stacking. FTIR spectra of GO flakes further confirms the presence of these functional groups. Bending of the C—OH groups (1378 cm⁻¹), C=O (1715 cm⁻¹) stretching vibration, and, the C—O and C—C stretching of epoxy groups at 1094 cm⁻¹ and 857 cm⁻¹ respectively, characterize the spectrum of air-dry.

Raman Spectra

Figure 23:
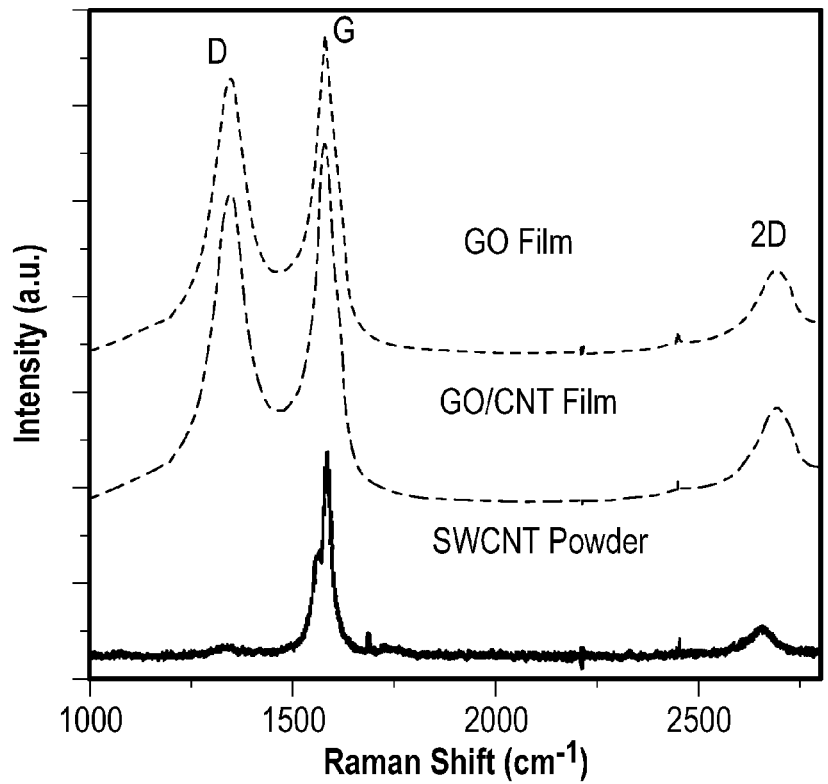
FIG. 23 illustrates Raman spectra of GO flakes, SWNT, and the GO-SWNT ink

FIG. 23 illustrates Raman spectra of GO flakes, SWNT, and the GO-SWNT ink. As illustrated in FIG. 23 of the GO flakes (e.g., GO film), the Raman spectra has a D (1320 cm⁻¹) band, G (1573 cm⁻¹) band, and a 2D (2640 cm⁻¹) band which demonstrate the characteristic peaks of GO material. $I_D/I_G$ ratios of 1:1 and 2:1 confirm the presence of double layer or single layer GO flakes. Thus, since the $I_D/I_G$ ratio is 2:1, the GO flakes are determined to be single layer GO flakes.

Interaction of molecules with graphene could be characterized with Raman spectra where the D, G and 2D bands are useful in understanding the nature of chemical interactions. The full-width-at-half-maximum (FWHM) of the G band increases with the mixing of SWNT and GO indicating electronic structure changes via π-π interaction of GO sheets and SWNTs.

Such a synergistic effect increases the effective surface area of the GO-SWNT composite, which increases the density of active sites for electrochemical reaction. Effortless binding with paper of such an ink material provides the means for low cost fabrication of electrodes without any binder or additives. Hence, this GO-SWNT composite material can provide tremendous opportunities for low-cost roll-to-roll fabrication of electrochemical double layer capacitors (EDLC).

Electrochemical Testing

The two electrodes of the packaged cell were connected to an electrochemical analyzer (Gamry Reference 600™) with alligator clips. Cyclic voltammetry (CV), and chrono-potentiometry (charge-discharge (CD)) scans are performed with a voltage window of 1 volt in the range −0.5 to 0.5 V at scan rates ranging from 5 mV sec⁻¹ to 500 mV sec⁻¹. Potentiostatic EIS measurements are performed between 0.1 Hz and 1 MHz with amplitude of 10 mV.

Figure 24:
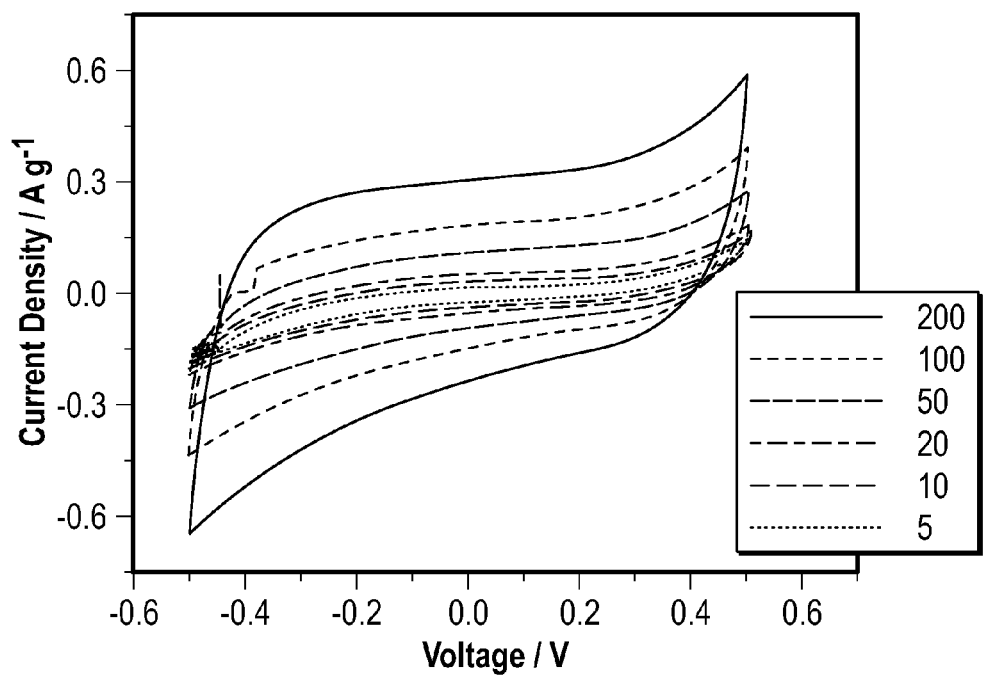
FIG. 24 illustrates a cyclic voltammetry (CV) plot for Example 1 under different scan rates having a GO:SWNT ratio of 5:1.
Figure 25:
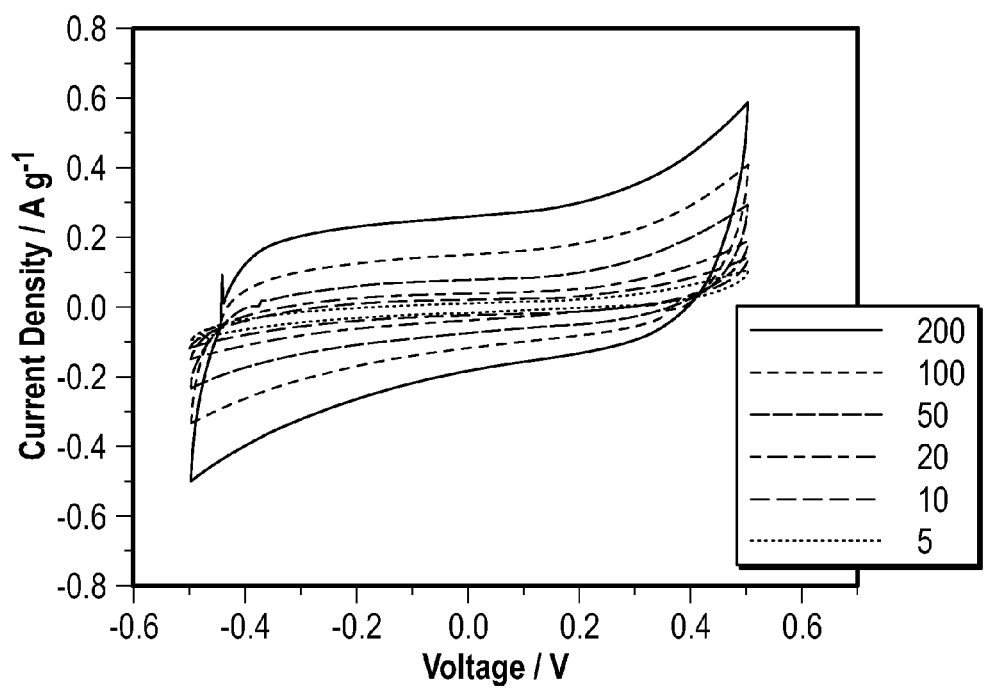
FIG. 25 illustrates a cyclic voltammetry (CV) plot for Example 1 under different scan rates having a GO:SWNT ratio of 1:1.
Figure 26:
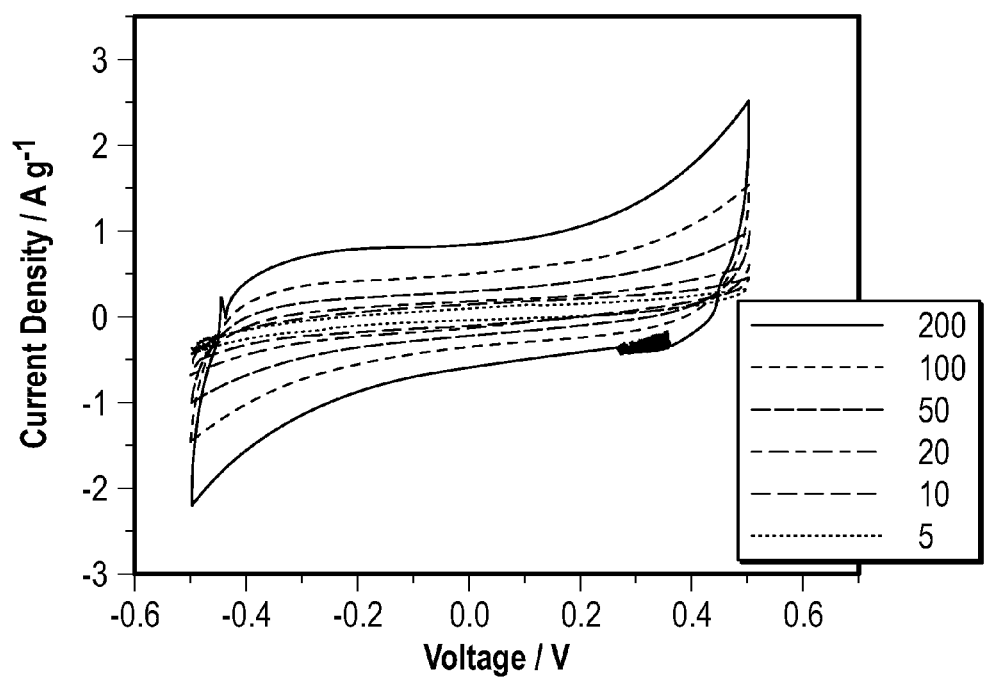
FIG. 26 illustrates a cyclic voltammetry (CV) plot for Example 1 under different scan rates having a GO:SWNT ratio of 1:3.
Figure 27:
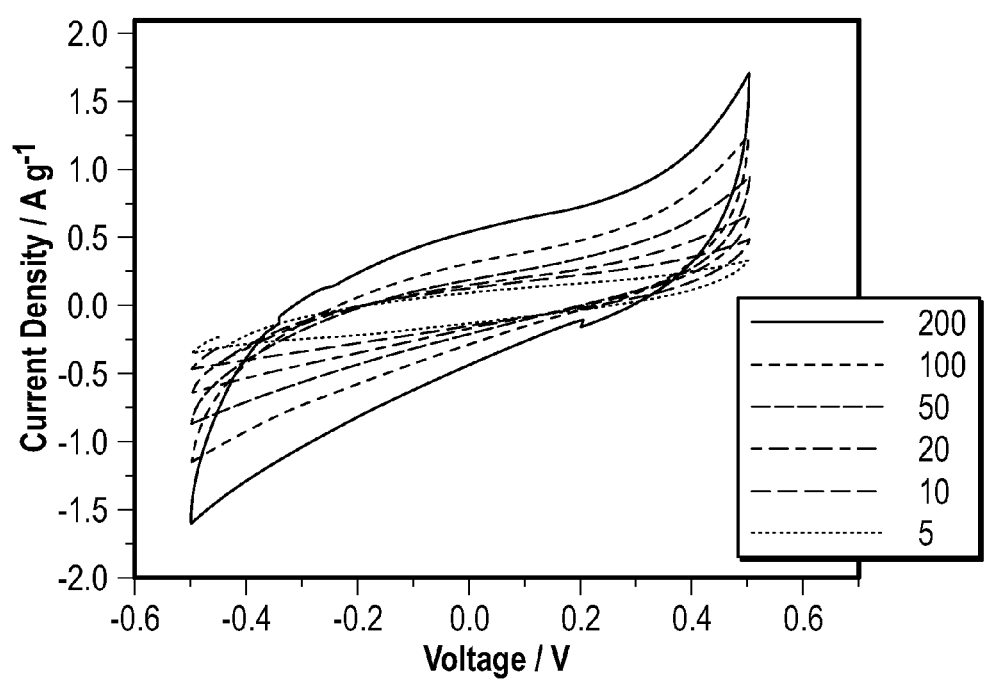
FIG. 27 illustrates a cyclic voltammetry (CV) plot for Example 1 under different scan rates having a GO:SWNT ratio of 1:5.

Cyclic voltammetry (CV) was performed to evaluate the electrochemical performance of the electrodes assembled in a symmetric two-electrode supercapacitor cell. FIGS. 24-27 illustrate the CV plot for Examples 1-4 under different scan rates. FIG. 24 illustrates the CV plot for Example 1 (GO:SWNT ratio of 5:1), FIG. 25 illustrates the CV plot for Example 2 (GO:SWNT ratio of 1:1), FIG. 26 illustrates the CV plot for Example 3 (GO:SWNT ratio of 1:3), and FIG. 27 illustrates the CV plot for Example 4 (GO:SWNT ratio of 1:5). As shown in FIGS. 24-27, varying ratios of GO/SWNT provides different specific capacitance values. GO/SWNT ratios of 5:1, 1:1, 1:3, and 1:5 at 5 mv/s provide specific capacitance values of 42.8 F/g, 24.0 F/g, 102.8 F/g, and 124.2 F/g, respectively. Specific capacitance values of $C_s$ are calculated from the CV curves using Eq. (1):

$$C_s = \frac{\int IdV}{m \times \Delta V \times S}$$

Where $C_s$ is the specific capacitance, $\int IdV$ is the integrated area of the CV curve, m is the mass of the active materials for one of the electrodes, $\Delta V$ is the voltage window, and S is the scan rate. Specific capacitance increases with an increase of the SWNT/GO ratio in the ink. The slight distortion from the rectangular shape of the CV curve is due to the pseudo-capacitance resulting from the various functional groups on the GO flakes.

The calculated specific capacitance is lower for a 1:1 ratio than the reported 90 F/g value which may be attributed to the actual mass of the active material used in the current measurements. In our fabrication process, both sides of a woven paper are covered with GO-SWNT. Although the woven paper has high porosity, ion transport from one side to the other side of the paper would be somehow prevented. Therefore, the actual active material, (e.g., material that has contribution to the capacitance) is much less than the total material used for preparing the electrode. Note that our specific capacitance values computed for different GO:SWNT ratios are higher than the value for GO itself (10.9 F/g).

Figure 28:
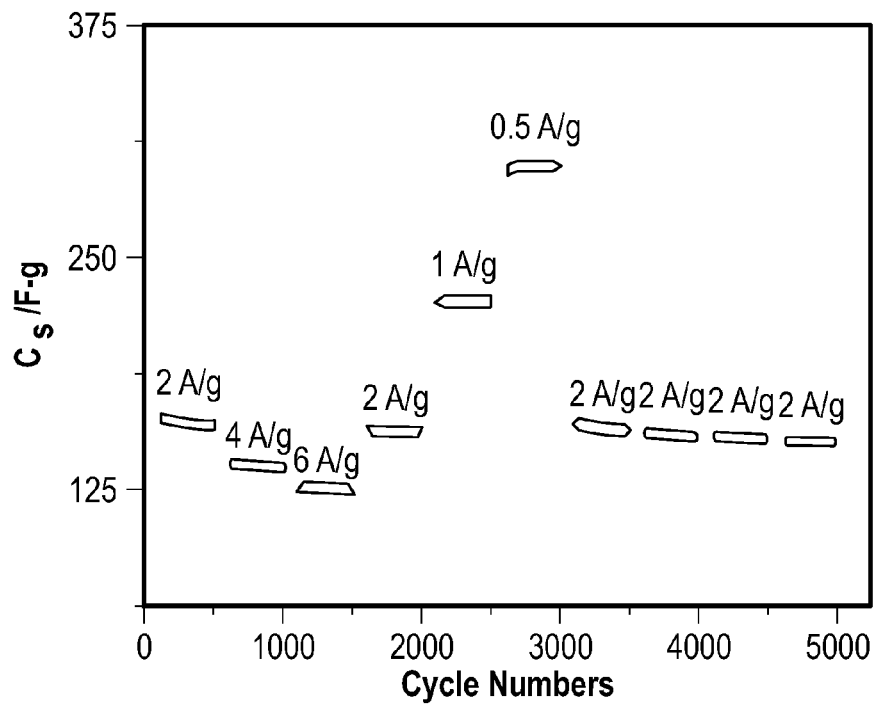
FIG. 28 illustrates specific capacitance measurements of Example 1 under different current density values.

FIG. 28 illustrates specific capacitance measurements of Example 4 under different current density values. Here, the highest capacitance value at 0.5 A/g is 295 F/g which is comparable with the value for functionalized GO-MWNT material, at 251 F/g. Many SWNT based supercapacitors have demonstrated specific capacitances in the range of 32-142 F/g depending on the functional groups or the types of SWNT (e.g, metallic or semiconducting tubes).

Cycling stability is an important property for supercapacitor devices. The cycling stability of our material system using galvanostatic charge-discharge measurements. The specific capacitance values at different current densities are calculated using Eq. (2) below:

$$C_s = \frac{2i}{m\left(\frac{dV}{dt}\right)}$$

Where m is the carbon mass of one electrode, i is the discharge current and dV/dt is the slope of the discharge curve.

The GO/SWNT ratio of 1:5 demonstrates the highest specific capacitance, which consistently decreases with an increase in the charge-discharge current density. We ascribe this phenomenon to reduced access of ions to the active surface, especially for relatively slow faradic reactions.

Figure 29:
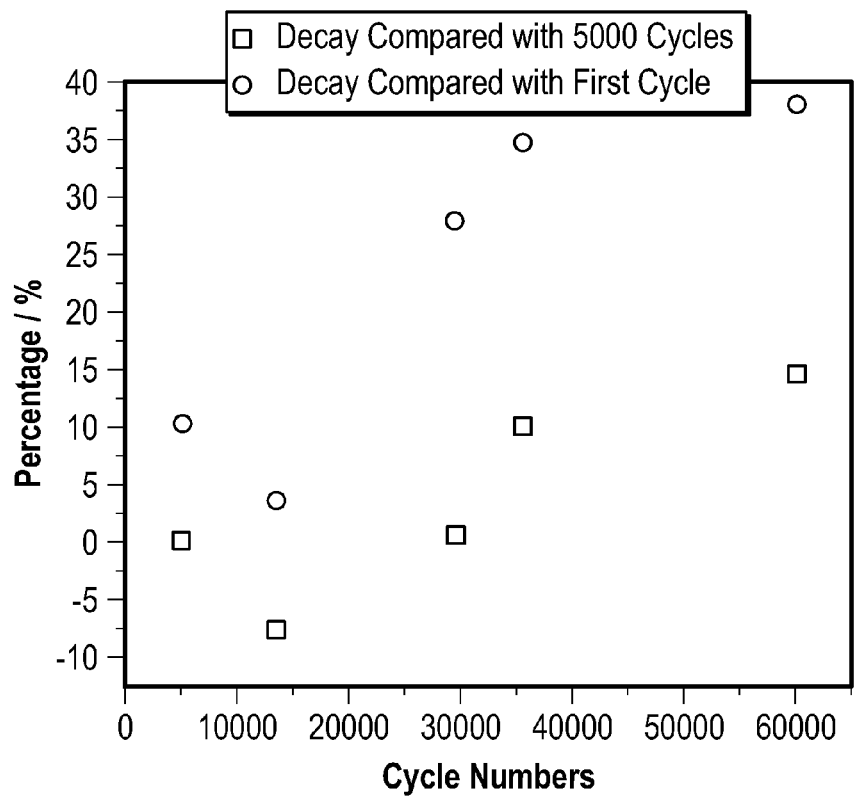
FIG. 29 illustrates a comparison of specific capacitance decay with the first cycle and the 5000 cycle.

FIG. 29 illustrates a comparison of specific capacitance decay with the first cycle and the 5000 cycle of Example 4. After 5000 cycles, the capacitance value decreased by 11% which shows the higher stability of our composite ink material compared to that of reduced GO material alone. The charge-discharge cycles continued at 2 A/g for 60000 cycles. Only 64% capacitance retention was observed compared to the first cycle. However, 85% retention was achieved compared to the 5000$^{th}$ cycle. This clearly indicates the high stability of our composite ink material for supercapacitor electrodes. Interestingly, it was observed that the capacitance increase after 5000 cycles. Active sites for both sides of the active material may increase after many cycles and GO may be partially reduced to graphene or the tips of SWNTs might be open which increases the total surface area, therefore the capacitance has increased. This phenomenon further indicates the stability of the electrode material during the long cycle testing.

Figure 30:
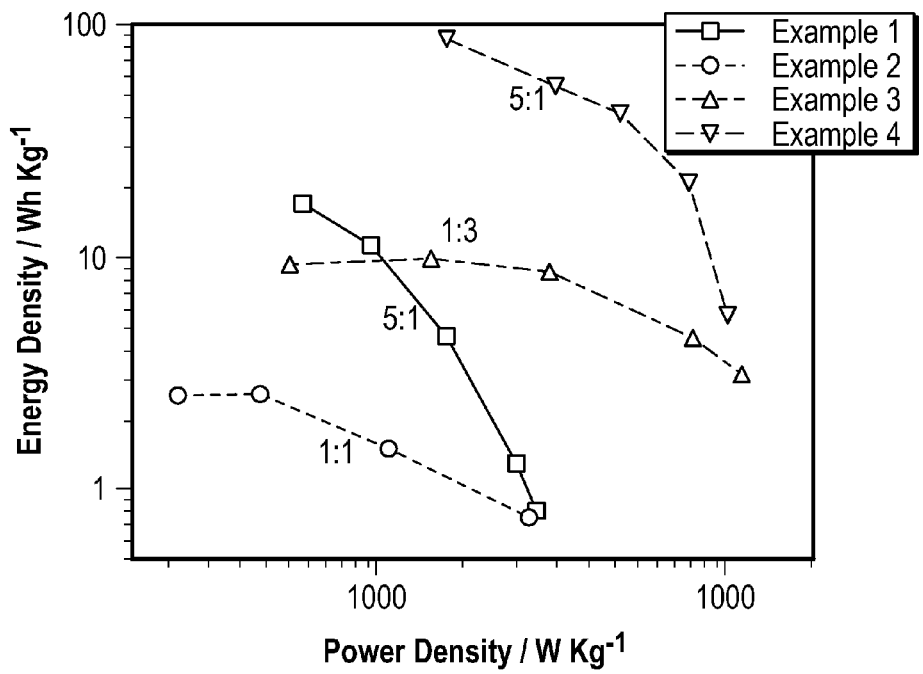
FIG. 30 illustrate Ragon plots for Examples 1-4 having different GO:SWNT ratios.

The energy density (E) and power density (P) are calculated using Equations (3) and (4):

$$E = \frac{1}{2}C_s(\Delta V)^2 \quad (3)$$

and $$P = \frac{s}{t} \quad (4)$$

where t is the total time of discharge. $C_s$ is the specific capacitance value from the charge-discharge measurements, and $\Delta V$ is the potential range which is 1.0 V for aqueous electrolyte. Ragone plots are obtained accordingly for different ratios of GO/SWNT. FIG. 30 illustrate Ragone plots for Examples 1-4 having different GO:SWNT ratios. It is clear that the composite ink material demonstrates the highest power density with a GO/SWNT ratio of 1:5 which is in accordance with the capacitance measurements. A 1:1 ratio for the ink shows lower performance which is in accordance with the CV measurements. Too many bundled SWNTs and/or stacked GO flakes due to the interaction between GO and SWNT might be the reason for the low performance. The power density of the capacitors reaches a value of 10 kW/kg, which is higher than the value for GO based or CNT based supercapacitors.

Figure 31:
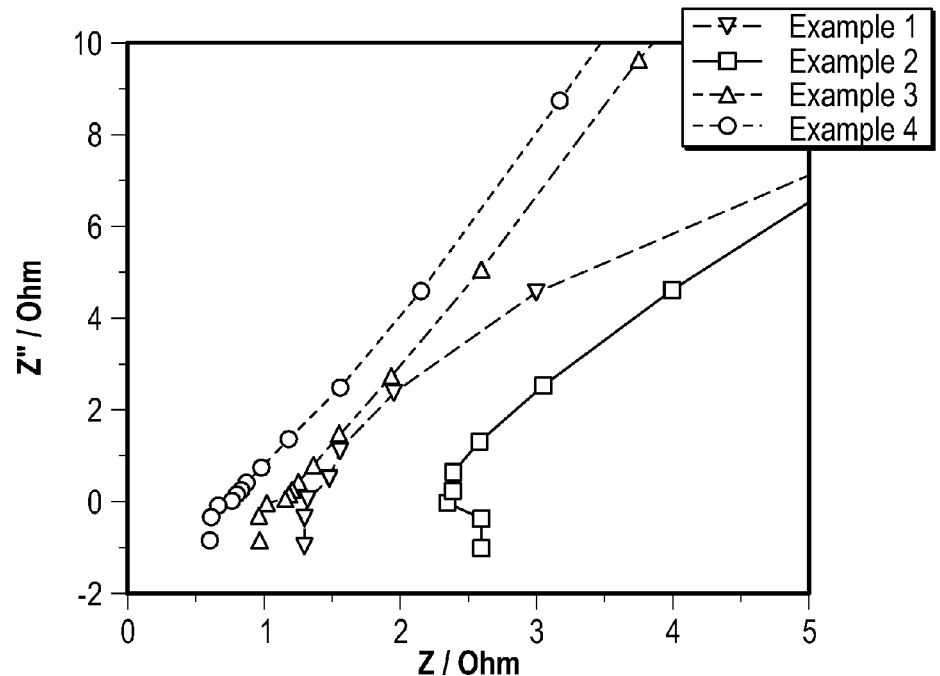
FIG. 31 illustrates electrochemical impedance spectroscopy (EIS) of Examples 1-4 having different GO:SWNT ratios.

FIG. 31 illustrates electrochemical impedance spectroscopy (EIS) of Examples 1-4 having different GO:SWNT ratios. As illustrated in FIG. 31, as the amount of the SWNT increases, the internal resistance decreases.

Summary

The SWNTs were successfully dispersed at a concentration up to 12 mg/ml using GO material without surfactant assistance. The GO-SWNT paper electrodes are binder-free and are prepared via dipping the paper substrate into the GO-SWNT dispersion, followed by vacuum oven drying. Without reduction of the GO material, we demonstrate a specific capacitance value of 295 F/g at a charge-discharge current density of 0.5 A/g. 85% capacitance retention after 60000 charge-discharge cycles demonstrates the high electrochemical stability of the supercapacitor electrodes. The present disclosure provides for ink based low-cost and roll-to-roll fabrication of energy storage devices for a wide range of applications.

Various Notes & Examples

To further describe the methods and hybrid carbon nanotube and graphene nanostructures disclosed herein, a non-limiting list of examples is provided here:

In Example 1, an energy device comprises a paper based substrate having a top surface and a bottom surface; and a graphene oxide and carbon nanotube composite deposited onto at least the top surface.

In Example 2, the subject matter of Example 1 can optionally be configured such that the graphene oxide and carbon nanotube composite is substantially free from a surfactant.

In Example 3, the subject matter of any one or any combination of Examples 1 or 2 can optionally be configured such that the graphene oxide and carbon nanotube composite comprises about 15 weight percent to about 85 weight percent of graphene oxide.

In Example 4, the subject matter of any one or any combination of Examples 1 through 3 can optionally be configured such that the graphene oxide and carbon nanotube composite comprises about 15 weight percent to about 85 weight percent of carbon nanotubes.

In Example 5, the subject matter of any one or any combination of Examples 1 through 4 can optionally be configured such that the carbon nanotubes are single-wall carbon nanotubes.

In Example 6, the subject matter of any one or any combination of Examples 1 through 5 can optionally be configured such that the energy device does not include a binder.

In Example 7, the subject matter of any one or any combination of Examples 1 through 6 can optionally be configured such that the graphene oxide is a single layer graphene oxide flake.

In Example 8, the subject matter of any one or any combination of Examples 1 through 7 can optionally be configured such that the single layer graphene oxide flake has a thickness within a range of about 0.35 nanometers to about 50 nanometers.

In Example 9, the subject matter of any one or any combination of Examples 1 through 8 can optionally be configured such that the single layer graphene oxide flake has a length within a range of about 200 nanometers to about 500 nanometers.

In Example 10, a supercapacitor can include a first electrode including: a first paper based substrate having a top surface and a bottom surface, and a first graphene oxide and carbon nanotube composite deposited onto at least the top surface; a second electrode, including: a second paper based substrate having a top surface and a bottom surface, and a second graphene oxide and carbon nanotube composite deposited onto at least the top surface; an electrolyte; and a separator positioned between the first electrode and the second electrode.

In Example 11, the subject matter of any one or any combination of Examples 1 through 10 can optionally be configured such that the first graphene oxide and carbon nanotube composite and the second graphene oxide and carbon nanotube composite comprise about 15 weight percent to about 85 weight percent of graphene oxide.

In Example 12, the subject matter of any one or any combination of Examples 1 through 11 can optionally be configured such that the graphene oxide and carbon nanotube composite and the second graphene oxide and carbon nanotube composite comprise about 15 weight percent to about 85 weight percent of carbon nanotubes.

In Example 13, the subject matter of any one or any combination of Examples 1 through 12 can optionally be configured such that wherein the carbon nanotubes are single-wall carbon nanotubes.

In Example 14, the subject matter of any one or any combination of Examples 1 through 13 can optionally be configured such that the first graphene oxide and carbon nanotube composite and the second graphene oxide and carbon nanotube composite comprise a plurality of graphene oxide flakes, the graphene oxide flake having a thickness within a range of about 0.35 nanometers to about 50 nanometers and a length within a range of about 200 nanometers to about 500 nanometers.

In Example 15, a method can include obtaining or providing a graphene oxide and carbon nanotube dispersion, the graphene oxide and carbon nanotube dispersion substantially free from a surfactant; and depositing the graphene oxide and carbon nanotube dispersion onto a surface of a paper based substrate.

In Example 16, the subject matter of any one or any combination of Examples 1 through 15 can optionally be configured such that the graphene oxide and carbon nanotube dispersion comprises carbon nanotubes within a range of about 0.5 milligrams per milliliter to about 12 milligrams per milliliter.

In Example 17, the subject matter of any one or any combination of Examples 1 through 16 can optionally be configured to include treating the coated porous metal substrate with ultraviolet-generated ozone for a time period.

In Example 18, the subject matter of any one or any combination of Examples 1 through 16 can optionally be configured to include drying the graphene oxide and carbon nanotube dispersion deposited onto the surface of the paper based substrate In Example 19, the subject matter of any one or any combination of Examples 1 through 18 can optionally be configured such that wherein the pH of the graphene oxide and carbon nanotube dispersion is within a range of about 6 to about 12.

In Example 20, the subject matter of any one or any combination of Examples 1 through 19 can optionally be configured such that the carbon nanotubes are single-wall carbon nanotubes.

These non-limiting examples can be combined in any permutation or combination. The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the application, the terms "including" and "in which" are used as the plain-English equivalents of the respective terms "comprising" and "wherein." Also, in the following claims, the terms "including" and "comprising" are open-ended, that is, a method, a battery, or an energy device that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" should be interpreted to include not just 0.1% to 5%, inclusive, but also the individual values (e.g., 1%, 2%, 3%, and 4%) and the sub-ranges (e.g., 0.1% to 0.5%, 1.1% to 2.2%, 3.3% to 4.4%) within the indicated range. As used herein, the term "about" can be defined to include a margin of error, for example, at least +/−10%.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An energy device, comprising
a paper based substrate having a top surface and a bottom surface; and
a pure graphene oxide and carbon nanotube composite deposited from a liquid dispersion onto at least the top surface.

2. The energy device of claim 1, wherein the pure graphene oxide and carbon nanotube composite is substantially free from a surfactant.

3. The energy device of claim 1, wherein the pure graphene oxide and carbon nanotube composite comprises about 15 weight percent to about 85 weight percent of graphene oxide.

4. The energy device of claim 1, wherein the pure graphene oxide and carbon nanotube composite comprises about 15 weight percent to about 85 weight percent of carbon nanotubes.

5. The energy device of claim 1, wherein the carbon nanotubes are single-wall carbon nanotubes.

6. The energy device of claim 1, wherein the energy device does not include a binder.

7. The energy device of claim 1, wherein the pure graphene oxide is a single layer graphene oxide flake.

8. The energy device of claim 7, wherein the single layer graphene oxide flake has a thickness within a range of about 0.35nanometers to about 50nanometers.

9. The energy device of claim 7, wherein the single layer graphene oxide flake has a length within a range of about 200nanometers to about 500nanometers.

10. A super capacitor, comprising:
a first electrode including:
a first paper based substrate having a top surface and a bottom surface, and
a first pure graphene oxide and carbon nanotube composite deposited from a liquid dispersion onto at least the top surface;
a second electrode, including:
a second paper based substrate having a top surface and a bottom surface, and
a second pure graphene oxide and carbon nanotube composite deposited from a liquid dispersion onto at least the top surface;
an electrolyte; and
a separator positioned between the first electrode and the second electrode.

11. The supercapacitor of claim 10, wherein the first pure graphene oxide and carbon nanotube composite and the second pure graphene oxide and carbon nanotube composite comprise about 15weight percent to about 85weight percent of graphene oxide.

12. The supercapacitor of claim 10, wherein the pure graphene oxide and carbon nanotube composite and the second pure graphene oxide and carbon nanotube composite comprise about 15weight percent to about 85weight percent of carbon nanotubes.

13. The supercapacitor of claim 12, wherein the carbon nanotubes are single-wall carbon nanotubes.

14. The supercapacitor of claim 10, wherein the first pure graphene oxide and carbon nanotube composite and the second pure graphene oxide and carbon nanotube composite comprise a plurality of graphene oxide flakes, the graphene oxide flake having a thickness within a range of about 0.35nanometers to about 50nanometers and a length within a range of about 200nanometers to about 500nanometers.

15. A method, comprising:
obtaining or providing a pure graphene oxide and carbon nanotube dispersion, the pure graphene oxide and carbon nanotube dispersion substantially free from a surfactant; and
depositing the pure graphene oxide and carbon nanotube dispersion onto a surface of a paper based substrate.

16. The method of claim 15, wherein the pure graphene oxide and carbon nanotube dispersion comprises carbon nanotubes within a range of about 0.5milligrams per milliliter to about 12milligrams per milliliter.

17. The method of claim 15, comprising drying the pure graphene oxide and carbon nanotube dispersion deposited onto the surface of the paper based substrate.

18. The method of claim 15, wherein the pH of the pure graphene oxide and carbon nanotube dispersion is within a range of about 6to about 12.

19. The method of claim 15, wherein the carbon nanotubes are single-wall carbon nanotubes.

* * * * *